United States Patent
Zhang

(10) Patent No.: US 10,067,280 B2
(45) Date of Patent: Sep. 4, 2018

(54) BACKLIGHT MODULE

(71) Applicant: SHENZHEN CHINA STAR OPTOELECTRONICS TECHNOLOGY CO., LTD., Shenzhen (CN)

(72) Inventor: Yanxue Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 69 days.

(21) Appl. No.: 14/417,651

(22) PCT Filed: Dec. 3, 2014

(86) PCT No.: PCT/CN2014/092893
§ 371 (c)(1),
(2) Date: May 20, 2016

(87) PCT Pub. No.: WO2016/074294
PCT Pub. Date: May 19, 2016

(65) Prior Publication Data
US 2017/0285241 A1    Oct. 5, 2017

(30) Foreign Application Priority Data

Nov. 14, 2014  (CN) .......................... 2014 1 0650010

(51) Int. Cl.
*F21V 7/04*      (2006.01)
*F21V 8/00*      (2006.01)
(Continued)

(52) U.S. Cl.
CPC .............. *G02B 6/0021* (2013.01); *F21S 8/00* (2013.01); *G02B 6/0031* (2013.01);
(Continued)

(58) Field of Classification Search
CPC .. G02B 6/0021; G02B 6/0036; G02B 6/0031; G02B 6/0055; G02B 6/0068; G02B 6/0091; G02F 1/133608; F21S 8/00
(Continued)

(56) References Cited

U.S. PATENT DOCUMENTS 5,618,096 A *  4/1997  Parker .................. G02B 6/0018
                                                  362/23.16
7,473,022 B2   1/2009  Yoo
(Continued)

FOREIGN PATENT DOCUMENTS

CN         1955814 A  *  5/2007
CN       101231425 A     7/2008
(Continued)

OTHER PUBLICATIONS

Google English Translation of CN101533182A Sep. 16, 2009.*
(Continued)

*Primary Examiner* — Anh Mai
*Assistant Examiner* — Glenn Zimmerman
(74) *Attorney, Agent, or Firm* — Buchanan Ingersoll & Rooney PC

(57) ABSTRACT

The invention discloses a backlight module, comprising: a light guide plate provided with a strip-shaped slot, a light bar, which comprises a base plate and a plurality of mounting bases mounted on the base plate, each mounting base is provided with a lighting element respectively, wherein the base plate of the light bar is configured to engage with the first surface of the light guide plate, such that all the mounting bases can be accommodated within the strip-shaped slot. It is unnecessary for the backlight module to set up rubber frame and back plate, hence, the backlight module without outer frame border is formed.

8 Claims, 3 Drawing Sheets

(51) Int. Cl.
F21S 8/00 (2006.01)
G02F 1/1335 (2006.01)

(52) U.S. Cl.
CPC ......... G02B 6/0068 (2013.01); G02B 6/0091 (2013.01); G02F 1/133608 (2013.01); *G02B 6/0036* (2013.01); *G02B 6/0055* (2013.01)

(58) Field of Classification Search
USPC ................... 362/612, 97.1, 97.2, 97.3, 97.4
See application file for complete search history.

(56) References Cited

U.S. PATENT DOCUMENTS

| | | | | |
|---|---|---|---|---|
| 8,508,693 | B2 | 8/2013 | Song et al. | |
| 8,876,319 | B2 * | 11/2014 | Kim | G02B 6/0018 362/97.1 |
| 2001/0043295 | A1 * | 11/2001 | Chen | G02F 1/13471 349/74 |
| 2007/0076140 | A1 * | 4/2007 | Mai | G02F 1/133615 349/61 |
| 2011/0167690 | A1 | 7/2011 | Bjarnason et al. | |
| 2012/0008308 | A1 * | 1/2012 | Adachi | G02B 6/0021 362/97.2 |
| 2012/0033447 | A1 * | 2/2012 | Hashino | G02B 6/0021 362/612 |
| 2012/0075886 | A1 * | 3/2012 | Park | G02B 6/0083 362/611 |
| 2013/0021819 | A1 * | 1/2013 | Wang | G02B 6/0038 362/607 |
| 2013/0033660 | A1 * | 2/2013 | Choi | G02B 6/0091 349/64 |
| 2013/0051069 | A1 | 2/2013 | Moon et al. | |
| 2015/0146110 | A1 * | 5/2015 | Matsukawa | H04N 5/64 348/790 |
| 2016/0116786 | A1 * | 4/2016 | Lee | G02F 1/133615 349/58 |

FOREIGN PATENT DOCUMENTS

| | | | | |
|---|---|---|---|---|
| CN | 101533182 | A * | 9/2009 | |
| CN | 202182391 | U | 4/2012 | |
| CN | 202209589 | U | 5/2012 | |
| CN | 203533350 | U | 4/2014 | |
| JP | WO 2014013944 | A1 * | 1/2014 | ............ H04N 5/64 |
| KR | 20110064743 | A | 6/2011 | |
| WO | 2010085015 | A1 | 7/2010 | |

OTHER PUBLICATIONS

Machine English Translation of CN1955814A May 2, 2007.*
International Search Report and Written Opinion of the International Searching Authority (Forms PCT/ISA/220, PCT/ISA/210 and PCT/ISA/237) dated Aug. 24, 2015, by the State Intellectual Property Office of China in corresponding International Application No. PCT/CN2014/092893. (12 pages).
Office Action dated Mar. 4, 2016, by the State Intellectual Property Office of China in corresponding Chinese Patent Application No. 201410650010.X. (8 pages).

* cited by examiner

BACKLIGHT MODULE

CROSS-REFERENCE TO RELATED APPLICATIONS

The present application claims benefit of Chinese patent application CN201410650010.X, entitled "a backlight module" and filed on Nov. 14, 2014, the entirety of which is incorporated herein by reference.

FIELD OF THE DISCLOSURE

The present disclosure relates to the technology of liquid crystal display (LCD), and in particular, to a backlight module.

BACKGROUND OF THE DISCLOSURE

A LCD panel comprises a backlight module, and a LCD screen attached to the backlight module. The backlight module is used as a light source for the LCD panel. The LCD screen can modulate light from the backlight module to display images and colors.

FIG. 1 shows an existing backlight module. The backlight module comprises a square back plate 4, a frame 3 mounted inside the back plate 4 and engaging with all inner side walls of the back plate 4, a light guide plate 2 which is surrounded by the frame 3 and clamped in the back plate 4 through the frame 3, and a light bar 5 provided at one end of the light guide plate 2. Lighting elements (not shown) are provided at the light bar 5. Light emitted from the lighting elements enter the light guide plate 2 from one side of the light guide plate 2. The light exits from an emergent surface of the light guide plate 2 after being reflected one or more times inside the light guide plate 2. The region of the frame 3 surrounding the emergent surface and the back plate 4 neither emit nor transmit light. Consequently, the frame 3 and the back plate 4 forms an outer frame border for the emergent surface edge of the light guide plate 2. Besides, in the existing backlight module, a black double-sided adhesive 6 is generally used to glue the backlight module and a LCD screen 1 together. The black double-sided adhesive 6 will absorb light and present a frame shape, so that an inner frame border of the backlight module with a decreased light transmissive area is formed.

Along with the LCD panel development of tablet PCs and mobile communication products toward narrow frame and frameless technology, a narrow framed or frameless backlight module is in urgent need.

SUMMARY OF THE DISCLOSURE

The technical problem essentially to be solved by the present disclosure is to remove the outer frame border of the backlight module.

To solve the above problem, the present application provides a backlight module, comprising: a light guide plate provided with a strip-shaped slot, and a light bar, comprising a base plate and a plurality of mounting bases mounted on the base plate, each mounting base is provided with a lighting element, wherein the base plate of the light bar is configured to engage with a first surface of the light guide plate, such that all the mounting bases can be accommodated within the strip-shaped slot.

In a particular embodiment, the base plate completely covers the strip-shaped slot.

In a particular embodiment, the strip-shaped slot extends in parallel to an outer side face of the light guide plate.

In a particular embodiment, the backlight module further comprises a reflective sheet, which is attached to a second surface of the light guide plate opposite to the first surface thereof, the mounting bases being abutted against the reflective sheet after passing through the strip-shaped slot.

In a particular embodiment, the light guide plate further comprises a positioning tab, which protrudes from the second surface and abuts against one side face of the reflective sheet, the height of the positioning tab being equal to the thickness of the reflective sheet.

In a particular embodiment, the backlight module further comprises an optical film attached to the first surface of the light guide plate and abutted against one side face of the base plate, the thickness of the base plate being equal to the thickness of the optical film.

In a particular embodiment, the backlight module further comprises a transparent double-sided adhesive, one side of which is attached to the optical film and the base plate, while the other side thereof is used for gluing a LCD screen.

In a particular embodiment, each side face of the base plate not abutted against the optical film is flush with a corresponding outer side face of the light guide plate, each outer side face of the transparent double-sided adhesive is flush with a corresponding outer side face of the light guide plate, and each side face of the reflective sheet not abutted against the positioning tab is flush with a corresponding outer side face of the light guide plate.

In a particular embodiment, the backlight module further comprises a back plate, which comprises a horizontal plate part and two vertical plate parts projecting from opposite ends of the horizontal plate part respectively to the same side of the horizontal plate part, two opposite side faces of the light guide plate being abutted against the two vertical plate parts respectively, the other two side faces of the light guide plate being flush with corresponding side faces of the horizontal plate part respectively, with the strip-shaped slot being parallel to the vertical plate part.

In a particular embodiment, the mounting base is abutted against an incident surface of the light guide plate, and the lighting element is installed in an installation hole in a side face of the mounting base which is abutted against the incident surface.

As compared with the backlight module in the prior art, the backlight module according to the present disclosure needs no frame and back plate, thus forming a backlight module without an outer frame border. In addition, since it is unnecessary to provide the frame and the back plate, the backlight module can have a smaller volume, so that the space occupied thereby is even smaller. Hence, it is more suitable to be provided in tablet PCs and mobile communication products.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner.

DETAILED DESCRIPTION OF THE EMBODIMENTS

It should be noted that as long as there is no conflict, combinations of the above-described embodiments and of technical features therein are possible, and technical solutions obtained in this manner are intended to be within the scope of the present disclosure. In the following, the present disclosure will be further explained in connection with the accompanying drawings.

Figure 1:
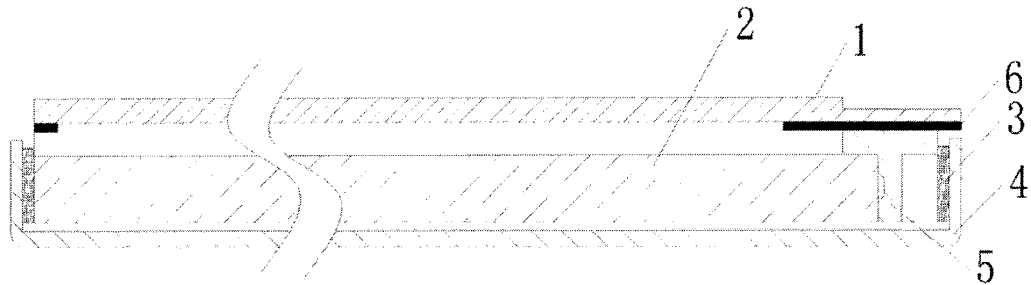
FIG. 1 shows a schematic sectional view of a backlight module in the prior art.
Figure 2:
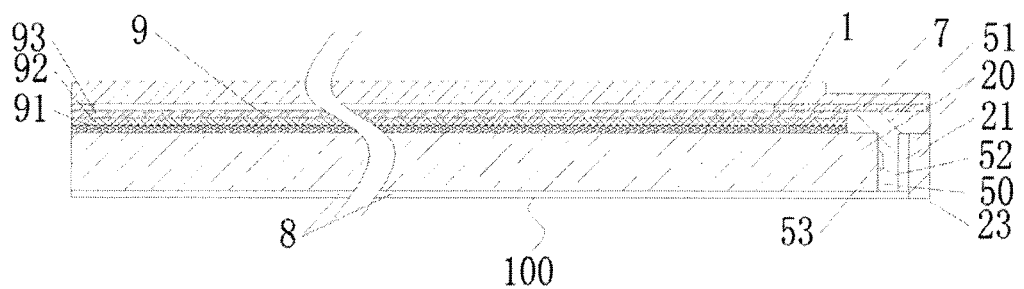
FIG. 2 shows a schematic sectional view of a backlight module according to a first embodiment of the present disclosure.

FIG. 2 to FIG. 6 schematically show the structure of a backlight module 100 according to a first embodiment of the present disclosure. In the embodiment, as shown in FIG. 2, the backlight module 100 comprises a light guide plate 20, and a light bar 50 provided on the light guide plate 20. The light bar 50 can be generally glued to the guide light plate 20.

Figure 3:
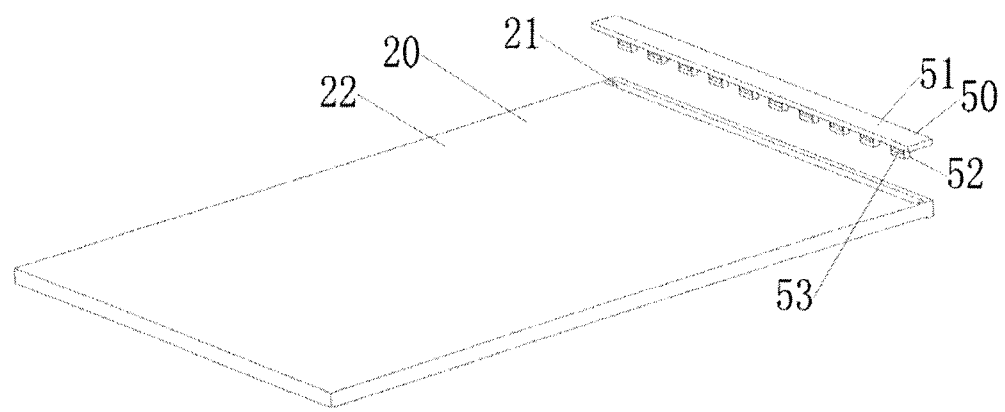
FIG. 3 schematically shows a perspective view of the light guide plate and the light bar as indicated in FIG. 2.
Figure 5:
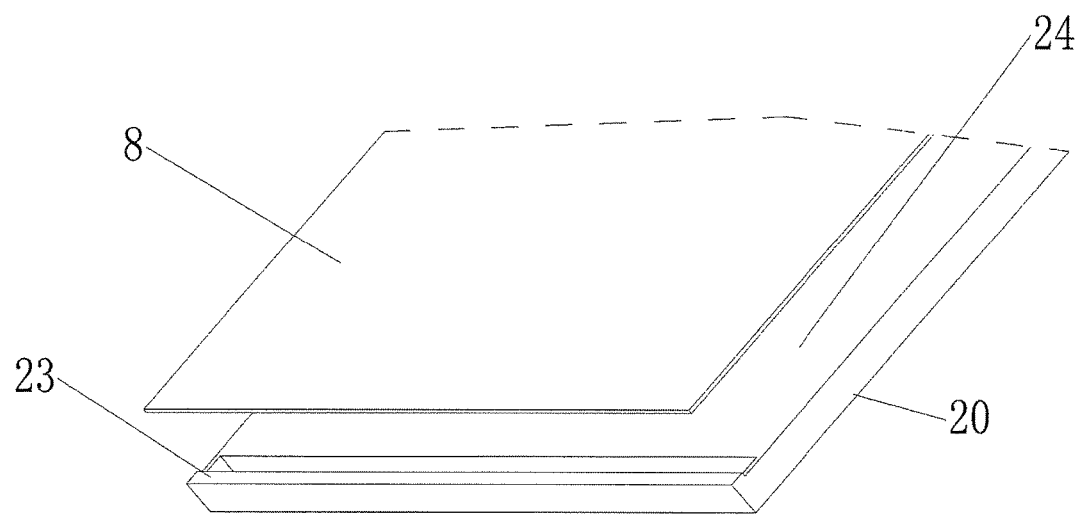
FIG. 5 schematically shows a partial perspective view of the light guide plate and the reflective sheet as indicated in FIG. 2.

The guide light plate 20 is generally made of transparent materials with higher refractivity. The transparent material could be optical grade polycarbonate or polymethyl methacrylate. Preferably, the light guide plate 20 has a larger refractivity than that of transparent materials with which the light guide plate is contacted. The light guide plate 20 is of a roughly rectangular plate-type structure. One plate surface of the light guide plate 20, that is, the first surface 22 (as shown in FIG. 3) is formed as an incident surface, while the other plate surface, i.e., the surface opposite to the first surface 22, is the second surface 24 (as shown in FIG. 5). Except for the second surface 24, other surfaces of the light guide plate 20, such as each outer side face, the first surface 22 or the like, are all very smooth. Some parts of the second surface 24 of the light guide plate 20 are bulged out, thus forming a group of dense reflective points. Preferably, a black layer is provided on each outer side face of the light guide plate 20. The black layer could absorb light emitting from the outer side faces, so as to avoid light leakage at the outer side faces.

According to the present disclosure, the light guide plate 20 is provided with a strip-shaped slot 21 which is perpendicular to the first surface 22 and the second surface 24. For example, the strip-shaped slot 21 is configured close to an outer side face of the light guide plate 20, and extends in parallel to the outer side face.

As shown in FIG. 3, the light bar 50 comprises a roughly strip-shaped base plate 51, and a plurality of mounting bases 52 that are all fixed on the base plate 51 but spaced from each other. On each mounting base 52 is provided with an lighting element. The lighting element could be a light emitting diode. As shown in FIG. 2, the light bar 50 could match with the light guide plate 20, so that the base plate 51 of the light bar 50 could engage with the first surface 22 of the light guide plate 20, for example, through adhesive; in the meantime, all the mounting bases 52 of the light bar 50 are accommodated within the strip-shaped slot 21, and all the lighting elements of the light bar 50 face a side wall of the strip-shaped slot 21 in parallel to the extension direction thereof. Hence, the side wall becomes an incident surface of the light guide plate 20.

In this way, the light from the lighting elements could enter the light guide plate 20 through the incident surface, and then exit from the first surface 22 after one or more reflections. Particularly, after the light from the lighting elements runs through the incident surface, a part of which will be reflected to the group of reflective points provided on the second surface 24 of the light guide plate 20 after one or many times of reflections inside the light guide plate 20. Each reflective point could scatter out the light that is directed onto the surface thereof and has an incident angle larger than a critical angle. A part of scattered light is directed to the first surface 22, with the incident angle on the first surface 22 smaller than the critical angle. Hence, the part of scattered light exits from the light guide plate 20 through the first surface 22. By this configuration, the frame 3 and the back plate 4 as adopted in the prior art are unnecessary in the backlight module 100 according to the present disclosure, thus removing the outer frame border of the backlight module. Besides, the backlight module is smaller in volume with low manufacturing cost.

In an embodiment, the base plate 51 is configured to cover the strip-shaped slot 21 completely. Because of the existence of the strip-shaped slot 21, the strength of the light guide plate 20 at the strip-shaped slot 21 will be decreased, therefore, the strip-shaped slot 21 forms a weak part of the light guide plate 20. The base plate 51 bridges across two sides of the strip-shaped slot 21, so that the strength of the light guide plate 20 at the strip-shaped slot 21 is increased, enabling the light guide plate 20 not easy to bend at the strip-shaped slot 21.

Figure 4:
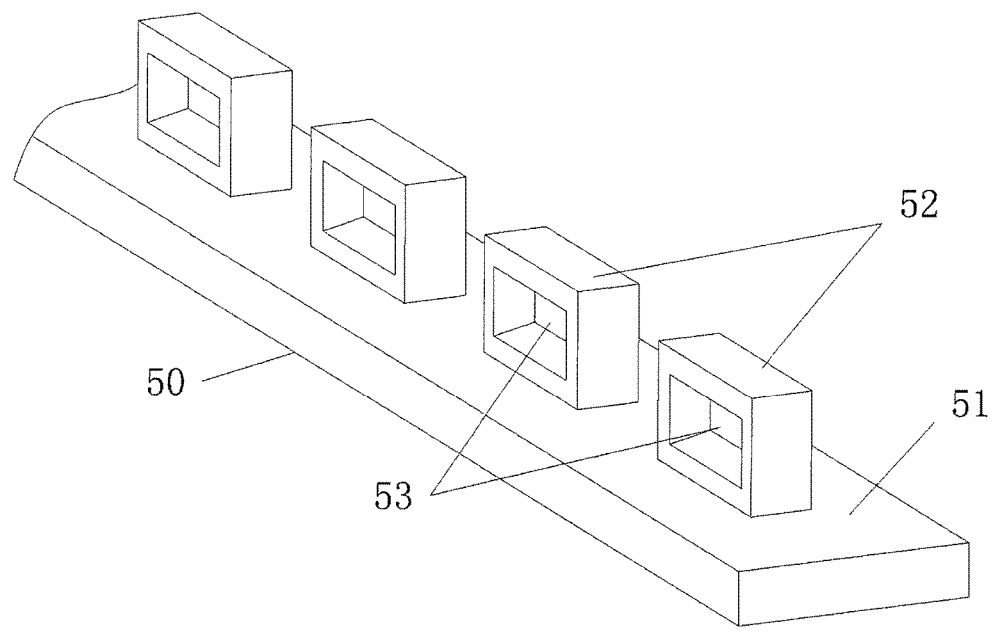
FIG. 4 schematically shows a partial enlarged view of the light bar as indicated in FIG. 3.

As shown in FIG. 4, several mounting bases 52 are vertically arranged on the base plate 51. Preferably, the mounting bases 52 are evenly distributed along the extension direction of the base plate 51. One surface of each of the mounting bases 52 abuts against the incident surface of the light guide plate 20. Preferably, on the surface of each mounting base 52 abutting against the incident surface of the light guide plate 20 is provided with an installation hole 53, in which one of the lighting elements is arranged. Preferably, the inner wall of the installation hole 53 is provided with a reflective layer, through which the light from the lighting element to the mounting base 52 can be reflected into the light guide plate 20. Preferably, each mounting base 52 forms an interference engagement with the strip-shaped slot 21, so that the mounting base 52 can tightly contact with the incident surface of the light guide plate 20, avoiding the light escaping from a space between the mounting base 52 and the incident surface.

As shown in FIG. 5, the backlight module 100 further comprises a reflective sheet 8 adhered to the second surface 24 of the light guide plate 20. For instance, the reflective sheet 8 can be made of polyethylene terephthalate. The reflective sheet 8 is opaque, but having a reflective surface. Therefore, the reflective sheet 8 could reflect the light that exits from the light guide plate 20 through the second surface 24 back to the light guide plate 20.

In an embodiment, the light guide plate 20 further comprises a positioning tab 23 protruding from the second surface 24. In this case, one side face of the reflective sheet 8 abuts against a side of the positioning tab 23, and the height of the positioning tab 23 is equal to the thickness of the reflective sheet 8. Hence, the positioning tab 23 can be used for pre-positioning the reflective sheet 8 when the reflective sheet 8 is mounted. Besides, the positioning tab 23 and the reflective sheet 8 bear the backlight module together, wherein the top of the positioning tab 23 is flush with the surface of the reflective sheet 8 away from the second surface 24. Thus, a smooth bearing surface is formed, so that the positioning tab 23 and the reflective sheet 8 are evenly forced. The positioning tab 23 could also avoid the ends of the reflective sheet 8 abutting against the positioning tab 23 from colliding with other components.

Besides, the mounting base 52 can be configured as abutting against the reflective sheetr 8 after passing through the strip-shaped slot 21. In this way, the mounting base 52 also supports the reflective sheet 8, avoiding the reflective sheet 8 from warping toward the strip-shaped slot 21.

In an embodiment, the backlight module 100 further comprises an optical film 9, which is adhered to the first surface 22 of the light guide plate 20, and preferably configured as abutting against the side face of the base plate 51. In an example, the optical film 9 consists of a diffusion film 91, a prism film 92 and a brightness enhancement film 93 that are stacked one by one in this order. The diffusion film 91 could be adhered to the first surface 22. The thickness of the optical film 9 can be set the same as the thickness of the base plate 51. Therefore, the surface of the optical film 9 away from the first surface 22 is flush with the surface of the base plate 51 of the light bar 50 away from the first surface 22. Thus a smooth bearing surface is formed, so that the optical film 9 and the light bar 50 are evenly forced.

The diffusion film 91 can contain a large amount of transparent particles. Hence, the light will refract when passing through these transparent particles, so that the light beam will scatter to every direction after passing through these transparent particles many times. The light is atomized after passing through the diffusion film 91. The atomized light is softer, and more evenly distributed.

For instance, the prism film 92 can comprise several sharp micro-prisms, which are located on one side of the prism film adjacent to the lightness enhancement film 93 and arranged in parallel to one another. The cross-section of each sharp micro-prism is approximate to an isosceles right triangle. Only a part of the incident light of the prism film 92 that is within a specific angle range can pass through the prism film 92 and enter the lightness enhancement film 93, while the remaining light, which cannot meet the refraction condition, will be reflected back to the diffusion film 91 by the prism film 92, and then is directed to the prism film 92 again under the cooperation of the diffusion film 91 and the reflective sheet 8.

For example, the lightness enhancement film 93 can comprise a reflective polarizer, and a diffusion layer attached to a surface of the reflective polarizer. The incident light with a specific polarization direction could pass through the reflective polarizer, and the incident light with other polarization directions would be reflected back to the prism film 92 for reuse. The specific polarization direction is consistent with that of the lower polarizer of the LCD screen 1. In this way, the transmission rate for the light from the lightness enhancement film 93 passing through the lower polarizer of the LCD screen 1 can be increased, so that the utilization for incident light of the lightness enhancement film 93 is increased correspondingly. The diffusion layer can atomize the light, such that the light would be softer.

In an embodiment, the backlight module further comprises a transparent double-sided adhesive 7. One side of the transparent double-sided adhesive 7 is glued to the lightness enhancement film 93 of the optical film 9 and the base plate 51, while the other side is used for gluing the LCD screen 1. The transparent double-sided adhesive 7 can be frame-shaped. In this way, the emergent light of the optical film 9 can reach LCD screen 1 after passing through the transparent double-sided adhesive 7. By adopting the transparent double-sided adhesive 7 instead of the black double-sided adhesive 6 in the prior art, the problem that the inner frame border of backlight module is formed due to use of the black double-sided adhesive 6 can be removed.

Figure 6:
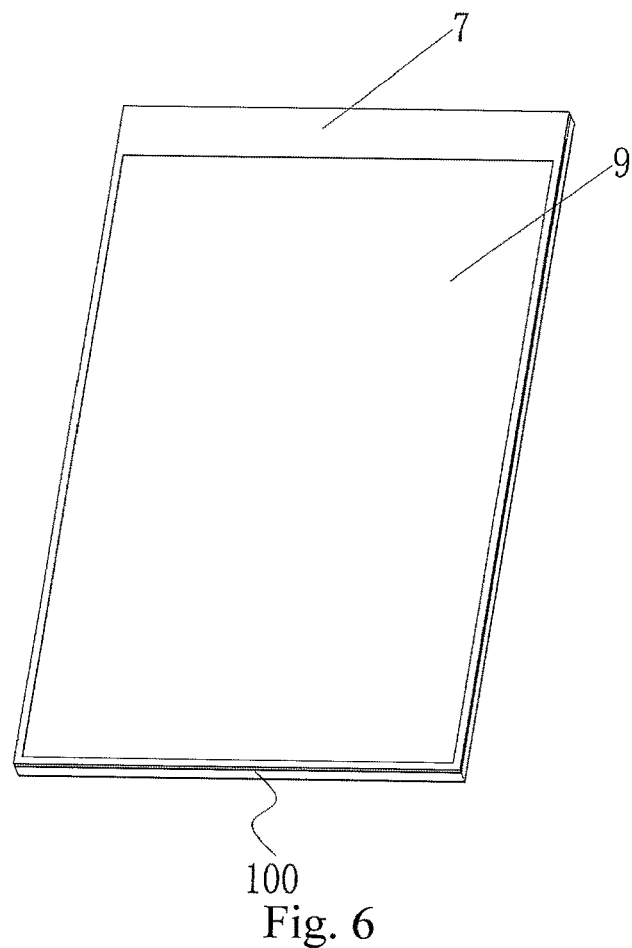
FIG. 6 is a schematic perspective view showing the general assembly of the backlight module according to a first embodiment of the present disclosure.

In a preferred embodiment, each side face of the base plate 51 of the light bar 50 that is not abutted against the optical film 9 is flush with a corresponding outer side face of the light guide plate 20, each outer side face of the transparent double-sided adhesive 7 is flush with a corresponding outer side face of the light guide plate 20, and each side face of the reflective sheet 8 which is not abutted against the positioning tab 23 is flush with a corresponding outer side face of the light guide plate 20. With this configuration, four side faces of the backlight module form four smooth bearing surfaces respectively, as shown in FIG. 6. The surface of the reflective sheet 8 of said backlight module away from the second surface 24 and the end face of the positioning tab 23 form a smooth bearing surface. In this way, all the five surfaces of the backlight module form smooth bearing surfaces respectively, which can simplify the design of the casing for mounting the backlight module, and the force exerted to the backlight module by the casing can be evenly distributed.

A second embodiment according to the present disclosure will be introduced in combination with FIG. 7 below. The backlight module 200 in the second embodiment according to the present disclosure only differs from the backlight module 100 in the first embodiment according to the present disclosure in that the former further comprises a back plate 10. Therefore, for the sake of conciseness, in the following only the structure of the back plate 10 and its connection with other components will be presented.

Figure 7:
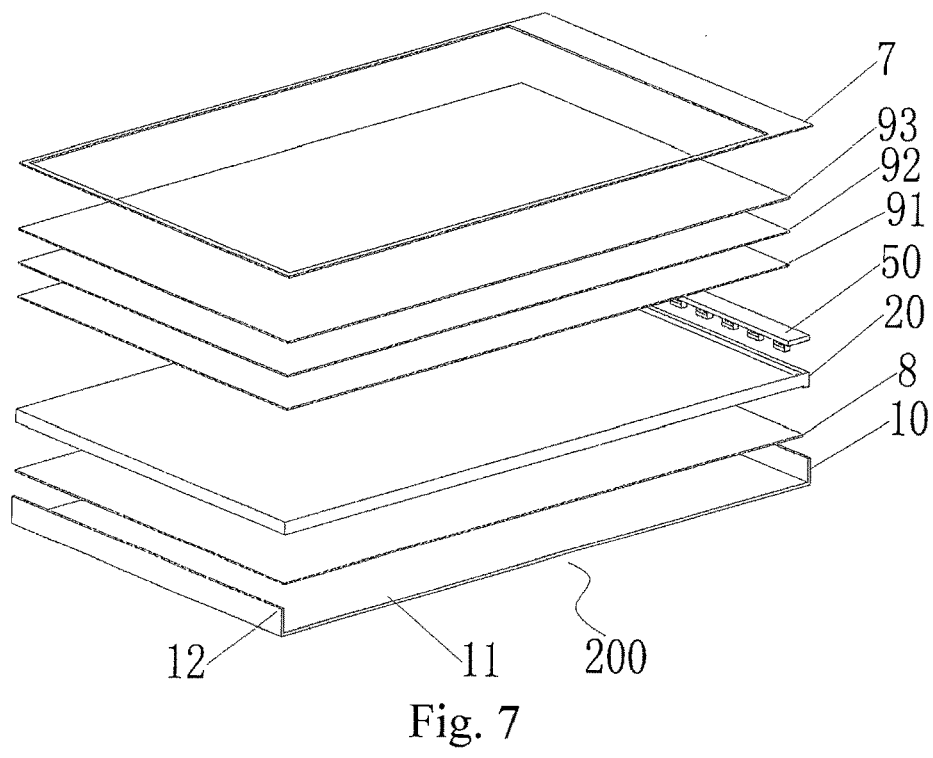
FIG. 7 schematically shows an exploded view of the backlight module according to a second embodiment of present disclosure.

As shown in FIG. 7, the backlight module 200 according to the second embodiment of the present disclosure further comprises the back plate 10. The back plate 10 comprises a horizontal plate part 11, and two vertical plate parts 12 protruding from two opposite ends of the horizontal plate part to the same side of the horizontal plate part respectively. The light guide plate 20 is mounted into a trough formed by the horizontal plate part 11 of back plate 10 and two vertical plate parts 12 thereof, with the strip-shaped slot 21 being arranged in parallel to the vertical plate part 12. Two opposite outer side faces of the light guide plate 20 are abutted against the two vertical plate parts 12 respectively. Besides, the other two outer side faces are flush with two side faces of the horizontal plate part respectively. The reflective sheet 8 is attached to the horizontal plate part 11. With the use of the back plate 10 for supporting other components, the outer frame border is reduced while the strength of the backlight module 200 is increased. This is because the outer frame border formed by the vertical plate parts 12 is merely distributed at two sides of the backlight module 200, and the other two sides of the backlight module 200 will not form outer frame border. Therefore, the backlight module 200 according to the second embodiment of the present disclosure could decrease the area of the outer frame border, and improve the strength thereof as well.

While the embodiments of the present disclosure are described above, the description should not be construed as limitations of the present disclosure, but merely as embodiments for readily understanding the present disclosure. Anyone skilled in the art, within the spirit and scope of the present disclosure, can make amendments or modification to the implementing forms and details of the embodiments. Hence, the scope of the present disclosure should be subject to the scope defined in the claims.

The invention claimed is:

1. A backlight module, comprising:
a light guide plate provided with a strip-shaped slot, and
a light bar, comprising a base plate and a plurality of mounting bases mounted on the base plate, each mounting base being provided with a lighting element,
wherein the base plate of the light bar is configured to engage with a first surface of the light guide plate, so that all the mounting bases are accommodated within the strip-shaped slot,
wherein the base plate completely covers the strip-shaped slot,
wherein the strip-shaped slot extends in parallel to an outer side face of the light guide plate,
wherein the backlight module further comprises of a reflective sheet, which is attached to a second surface of the light guide plate opposite to the first surface thereof, the mounting bases being abutted against the reflective sheet after passing through the strip-shaped slot, and
wherein the light guide plate further comprises a positioning tab, which protrudes from the second surface and abuts against one side face of the reflective sheet, the height of the positioning tab being equal to the thickness of the reflective sheet.

2. The backlight module according to claim 1, wherein the backlight module further comprises an optical film attached to the first surface of the light guide plate and abutted against one side face of the base plate, the thickness of the base plate being equal to the thickness of the optical film.

3. The backlight module according to claim 1, wherein the backlight module further comprises a back plate, which comprises a horizontal plate part and two vertical plate parts projecting from opposite ends of the horizontal plate part respectively to the same side of the horizontal plate part, two opposite side faces of the light guide plate being abutted against the two vertical plate parts respectively, the other two side faces of the light guide plate being flush with corresponding side faces of the horizontal plate part respectively, with the strip-shaped slot being parallel to the vertical plate part.

4. The backlight module according to claim 1, wherein the mounting base is abutted against an incident surface of the light guide plate, and the lighting element is installed in an installation hole in a side face of the mounting base which is abutted against the incident surface.

5. The backlight module according to claim 1, wherein the backlight module is free of a frame or back plate.

6. The backlight module according to claim 1, wherein the backlight module is free of an outer frame border.

7. The backlight module according to claim 2, wherein the backlight module further comprises a transparent double-sided adhesive, one side of which is attached to the optical film and the base plate, while the other side thereof is used for gluing a LCD screen.

8. The backlight module according to claim 7, wherein each side face of the base plate not abutted against the optical film is flush with a corresponding outer side face of the light guide plate, each outer side face of the transparent double-sided adhesive is flush with a corresponding outer side face of the light guide plate, and each side face of the reflective sheet not abutted against the positioning tab is flush with a corresponding outer side face of the light guide plate.

* * * * *